UNITED STATES PATENT OFFICE 2,131,533

CEMENT MASS

Karl Daimler and Heinz Thron, Frankfort-on-the-Main, Germany, assignors to I. G. Farbenindustrie Aktiengesellschaft, Frankfort-on-the-Main, Germany No Drawing. Application June 7, 1935, Serial No. 25,507. In Germany June 15, 1934

5 Claims. (Cl. 106—27)

The present invention relates to cement masses which, when worked up with water, yield particularly waterproof concrete and for the treatment of which only relatively small quantities of water are required.

We have found that the miscibility of the cement may be considerably improved and a liquid consistency may be imparted to the mixture without increasing the content of water by adding to the cement masses water-soluble salts of aliphatic or aromatic amines containing at least 8 carbon atoms. As additional substances of this kind are suitable, for instance, dodecylamine-chloride, ethyl-dodecylamine-acetate, dibutyl-aniline hydrochloride, dimethyl-dodecyl-benzyl-ammonium chloride, furthermore betaine prepared from triethanolamine and sodium chloracetate, moreover the numerous internal salts belonging to the class of betaine, for instance the compounds produced from dimethyl-dodecylamine and sodium chloracetate or sodium beta-chlorpropionate, the betaine prepared from dodecylamine, dimethyl-dodecyl-ammonium-methyl-sulfate, dimethyl-benzyl-dodecyl-ammonium chloride, dimethyl-dodecyl-ethyl-ammonium chloride.

The proportions in which the additional substances may be mixed with the cement vary according to the molecular weight of the substance; as a rule there is used a quantity from about 0.5 to about 2 per cent of the weight of the cement.

The following examples serve to illustrate the invention, but they are not intended to limit it thereto, the parts being by weight, if not stated otherwise:

1. Dodecyl-betaine prepared from dimethyl-dodecyl-amine and sodium chloracetate is dissolved in a quantity of 1 per mille (calculated upon the entire mixture of concrete) in the water used for mixing the cement. The magma of concrete is prepared with this water in the usual manner. For instance there are used for 100 parts of Portland cement and 480 parts of river sand 47 cc. of water which contain 0.6 gram of dissolved dodecyl-betaine. Owing to the addition of the betaine the consistency of the concrete is changed in the sense that whereas a similar concrete mixture made without the addition could only be used as compressed or rammed concrete, the mixture made in the above manner is suitable for casting and pouring or can be conveyed by means of a pump; an increased addition of water is not necessary.

2. An aqueous solution of 50 per cent. strength of dimethyl-dodecyl-benzyl-ammonium chloride is added to the cement mortar in a quantity of 2 per cent. of the cement used. If the same proportion of water is applied as was hitherto required for mixing concrete for compression, a liquid magma of concrete is produced owing to the addition of the ammonium salt. This magma is suitable for being cast or poured. For instance a mortar consisting of 100 parts of Portland cement, 480 parts of river sand and 47 cc. of water is mixed with 2 cc. of a solution of 50 per cent. strength of dimethyl-dodecyl-benzyl-ammonium chloride and the mixture is stirred until it is homogeneous.

Instead of dimethyl-dodecyl-benzyl-ammonium chloride there may be used with the same advantage the equal quantity of dimethyl-dodecyl-ethyl-ammonium chloride.

We claim:

1. As a new composition of matter a mixture of cement and a betaine of the formula:

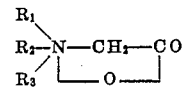

wherein $R_1$ stands for a high molecular alkyl radical and $R_2$ and $R_3$ stand for low molecular alkyl radicals.

2. As a new composition of matter a mixture of cement and a betaine containing at least 8 carbon atoms to the molecule.

3. As a new composition of matter a mixture of cement and a betaine of the formula:

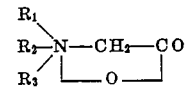

wherein $R_1$ stands for a radical containing from 12 to 16 carbon atoms, and $R_2$ and $R_3$ stand for a member of the group consisting of $CH_3$ and/or $C_2H_5$.

4. As a new composition of matter a mixture of cement and dodecyl betaine.

5. As a new composition of matter a mixture of cement and about 0.5 to about 2 per cent of dodecyl betaine.

KARL DAIMLER.
HEINZ THRON.